Nov. 21, 1944. E. FRISCHKNECHT 2,363,056
INDICATING DEVICE
Filed Sept. 19, 1940
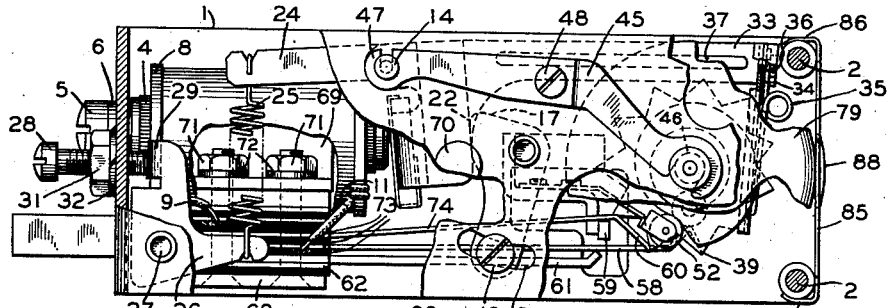
FIG. 1
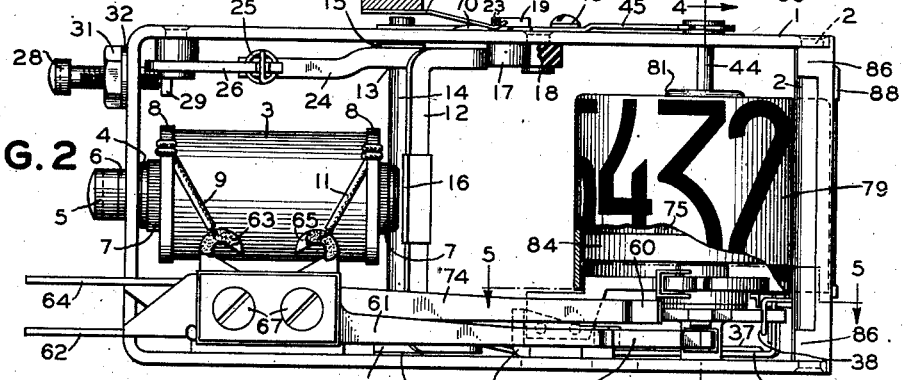
FIG. 2
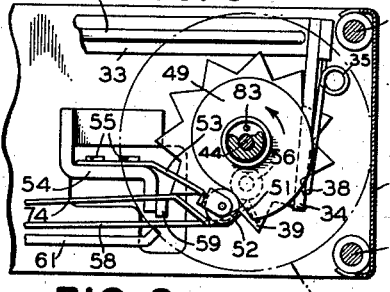
FIG. 5
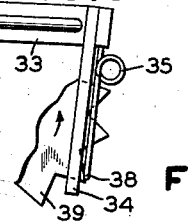
FIG. 6
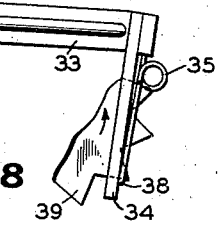
FIG. 7
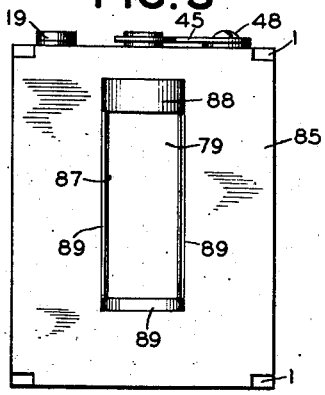
FIG. 3   FIG. 4
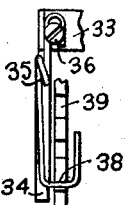
FIG. 8
FIG. 9
INVENTOR
E. FRISCHKNECHT
BY
ATTORNEY Patented Nov. 21, 1944

2,363,056

UNITED STATES PATENT OFFICE 2,363,056

INDICATING DEVICE

Ernest Frischknecht, Jackson Heights, N. Y., assignor to The Teleregister Corporation, New York, N. Y., a corporation of Delaware Application September 19, 1940, Serial No. 357,485

9 Claims. (Cl. 177—328)

This invention relates to indicating devices and especially to the general class of indicators such, for example, as is shown in the Patent No. 2,049,499 to Merton L. Haselton, granted August 4, 1936, these indicators being particularly adaptable for use in brokers' automatic market quotation boards to form part of, or be appurtenant to, and to be used with said boards as from time to time are adapted to any announcement or bulletin service other than market quotation services such, for example, as systems for disseminating and displaying information relative to the control of aircraft in flight, referred to herein as systems for airway traffic control.

In indicators of this class heretofore devised comprising a stepping magnet responsive to electrical impulses received for actuating an indicia bearing rotatable drum to different settings in accordance with the characters to be displayed, it is the general practice when the setting of the indicator is to be changed, to actuate the indicating drum to a blank or home position by a series of restoration impulses, in which position a contact mechanism is actuated to switch the winding of the stepping magnet from the circuit over which the restoration impulses are received to another circuit over which indicator actuating impulses are received in accordance with the value of the digit to be displayed by the indicating device. In high speed stock quotation systems particularly, wherein the information to be posted is received simultaneously by a plurality of operators from a plurality of quotation tickers associated with different exchanges such, for example, as the New York Stock Exchange, New York Curb Exchange, Chicago Board of Trade, and the like, the speed and reliability of the indicating devices employed for posting this information simultaneously at a plurality of brokers' offices in different cities is essential to the satisfactory operation of such a system. Furthermore, in the case of systems for displaying information regarding the control of airway traffic upon a bulletin or display board located, for example, at an airway traffic control center, wherein a large number of aircraft in flight and a plurality of airports along the routes of the different aircraft are transmitting information regarding the progress of the various flights of aircraft to be posted on the bulletin or display board by indicators of the general class disclosed herein, the speed and accuracy of operation of such indicators is a matter of utmost importance.

As the indicating devices of this class heretofore devised move into their blank or home positions, the energy required to actuate the switching mechanism thereof is added to the energy required by the indicator stepping mechanism to rotate the ratchet wheel and indicating drum. For this reason, when operating at high speeds such as the high speeds at which the indicators of the present invention are adapted to operate, these indicating devices may occasionally fail to step into their blank positions and actuate their switching mechanisms.

Among the objects of the present invention is the provision of a new and improved indicator unit having means for compensating for the energy required to actuate the switching mechanism of the unit and thereby substantially to equalize the work to be done by the indicator stepping mechanism during each operation thereof.

Another object is an indicator having a range of operation greater than that heretofore obtainable and which, through the new and improved means employed, will operate reliably at high speeds in response to impulses that vary within wide limits both with respect to the length of the impulses and the signal strength thereof.

Another object is a new and improved indicator structure having means whereby the indicator may be assembled and disassembled quickly, easily and without the use of a special tool.

Still another object of the invention is an indicator structure comprising a novel and improved mechanism for operating the indicator in which the cost of construction is low and which possesses the advantage of relative ease of adjustment.

The invention further resides in the features of combination, construction and arrangement hereinafter described and claimed.

For a better understanding of the invention and for illustration of one of the various forms it may take, reference is had to the accompanying drawing in which like numerals of reference are employed throughout the several views to designate like parts and in which:

Fig. 1 is a plan view of the indicator, partly broken away, to show more clearly certain features of the construction;

Fig. 2 is a side view, in elevation, of the indicator of Fig. 1;

Fig. 3 is a front view of the indicator of Fig. 2;

Fig. 4 is a view, partly in section, taken along the line 4—4 of Fig. 2;

Fig. 5 is a view of the device taken along the line 5—5 of Fig. 2 showing the armature in an unoperated position;

Fig. 6 is a view, partly broken away, of the device of Fig. 5 showing the armature in a partially operated position;

Fig. 7 is a view, partly broken away, of the device of Fig. 5 showing the armature fully operated;

Fig. 8 is a fragmentary detail view showing a jockey spring and the ratchet wheel teeth with which it reacts for positioning and centering the ratchet wheel; and Fig. 9 is an end view looking from the right of Fig. 6.

Referring first to Figs. 1 and 2 of the drawing, there is shown thereon a complete indicator unit according to one embodiment of the invention, the unit comprising a U-shaped frame 1 comprising an upper and lower portion to which are attached the posts 2 in any suitable manner, as by riveting the ends of the posts to the frame. An electro-magnet 3 comprising a core 4 is attached to the rear of the frame 1 by the screw 5 passing through the frame 1 and engaging a tapped hole within the core 4, a lock washer 6 inserted beneath the head of the screw 5 being employed to maintain the electro-magnet securely attached to the frame of the indicator unit. The core 4 of the electro-magnet is provided preferably with a knurled collar or flanged portion 7 at the ends of the core thereby to prevent movement of the insulated ends or heads 8 mounted thereon, this arrangement forming a spool or bobbin which supports the winding of the electro-magnet, the ends of the winding terminating in the conductors 9 and 11 passing through suitable holes in the spoolheads 8 or secured to the electro-magnet in any other suitable manner to prevent damage to the winding of the electro-magnet by movement of the conductors 9 and 11.

An armature 12 is pivoted at 13 upon the bearing rod 14 passing through suitable bearing holes at the upper and lower portions of the frame 1. A washer 15 is mounted on the bearing rod 14 intermediate the armature and the upper and lower portions respectively of the frame 1, sufficient clearance being provided to prevent binding between the armature and the frame of the unit as the armature operates. The armature is provided with a strip of non-magnetic material 16 such, for example, as phosphor bronze or the like, secured thereto as by wrapping tightly about the armature, and so positioned that it prevents physical contact of the armature with the core of the electro-magnet when the armature is in the fully operated position, thereby causing the armature to release quickly when the magnet is deenergized as is well known in the art to which the present invention pertains.

An adjustable back stop 17 is pivotally mounted on the bearing stud 18 secured to the frame and is provided with an adjusting screw 19 passing through a slotted portion 21, preferably arcuate in shape, of the frame of the indicator unit. The back stop is provided with a cam portion 22 adapted to engage the armature 12 in different positions of the armature in accordance with the setting of the back stop. A lock washer 23 is preferably provided between the head of the adjusting screw 19 and the frame 1 to maintain the back stop in any of its adjusted positions.

The armature 12 is provided with an arm 24 extending therefrom having a notch or hole therein to which is attached the retractile spring 25, the other end of the retractile spring being in engagement with the member 26 pivoted to the frame of the unit at 27. A screw 28 engages a tapped hole in the rear of the frame of the unit and engages the end 29 of the member 26 thereby causing the member 26 to assume different positions in accordance with the setting of the screw 28 and adjust the tension of the retractile spring 25. Means are thus provided for varying at will the force exerted by the spring 25 on the armature 12 which causes the armature to return to its unoperated position in contact with the backstop 17 at different rates of speed depending upon the adjustment of the screw 28. A lock nut 31 and lock washer 32 are provided to maintain the screw 28 in any of its set positions. The backstop 17 is made preferably of any suitable non-magnetic material such, for example, as brass, phosphor-bronze, Bakelite or the like, to prevent magnetic sticking of the armature against the backstop as the armature is disengaged therefrom by the energization of the electro-magnet 3.

The armature is also provided with a driving arm 33 secured thereto in any suitable manner, as by welding, having one end 34 thereof formed to provide a backstop for the resilient pawl member 35 secured at one end thereof to the driving arm 33 by the screw 36. The driving arm 33 may be of any suitable material such, for example, as steel, and is possessed of the advantage of considerable mechanical strength combined with a relatively small amount of weight, whereby the inertia of the armature is relatively small and the armature is quickly responsive to impulses received by the electro-magnet 3. A ribbed portion 37 is preferably provided throughout substantially the entire length of the driving arm to enable the same to be lighter in weight than would otherwise be possible without a decrease in the rigidity of the same. The resilient driving member 35 is provided with a bent or laterally extending portion 38, Fig. 2, formed to engage at certain times the teeth of the ratchet wheel 39 to step the wheel, in the direction indicated by the curved arrows in Figs. 5 to 7, during the return movement of the armature 12 and driving arm 33, Fig. 1, under the influence of the retractile spring 25, the spring member 35 being substantially in alignment with one face of the ratchet wheel and in contact with the member 34 when the armature is an unoperated position, such as shown in Fig. 5.

The ratchet wheel 39 is provided with eleven equally spaced teeth and secured to the hub 41 by the rivets 42. The hub 41 is provided with a bearing 43 by means of which the hub is pivotally mounted upon the bearing rod 44 passing through suitable bearing supports in the frame 1 of the indicator unit and retained in position by the locking member 45 having a slotted portion 46 in one end thereof adapted to engage a complementary portion of the shaft 44. The locking member 45 is also provided with a slotted portion 47 adapted to engage a complementary portion of the bearing shaft 14 thereby maintaining the shafts 44 and 14 in position, the screw 48 being provided for maintaining the locking member 45 in its locking position.

When it is desired to disassemble the indicator unit as, for example, when inspecting or cleaning the same, the screw 48 is loosened slightly, the locking member 45 is rotated about the screw 48 to clear the shafts 14 and 44 and the shafts 14 and 44 are withdrawn from the unit thereby disassembling the armature, the indicating drum and the ratchet wheel assembly. The entire disassembling operation just referred to may be performed within a fractional part of a minute and without employing special tools for this purpose. In addition to providing an indicator unit which is easily maintained in satisfactory operating condition, the construction of the structure disclosed enables the unit to be readily assembled thereby providing an indicator unit in which the cost of maintenance of the unit in satisfactory operating condition in service and the first cost of the unit are relatively low.

The hub 41 also supports the cam 49 mounted securely thereon and having a sharply sloping portion 51 adapted to be engaged by the roller 52 substantially as shown on Figs. 1 and 5 of the drawing. The roller 52 is pivotally mounted and carried by the resilient spring 53 secured to the support 54 in any well known manner as by the screws 55, the support 54 being attached to the frame of the unit by any suitable means such, for example, as by welding or brazing the parts together.

A roller 56 is pivotally mounted by the bearing support 57, Fig. 4, carried by the hub 41 and adapted to engage the contact spring 58 as the indicator drum moves into its blank position and cause the contact spring 58 to be disengaged from the grounded contact 59 and brought into engagement with the contact spring 61, the roller 52 passing over the inclined portion 51 of the cam 49 during the engagement of the spring 58 by the roller 56, whereby the action of the roller 52 against the cam surface 51 applies energy to the hub 41 sufficient to compensate for the energy required to actuate the contact spring 58 out of engagement with the grounded contact 59 and into operative engagement with the contact spring 61 as shown on Fig. 5 of the drawing. The contact 59 is mounted upon the support 54 and the setting of the contact 59 may be changed, if desired, by adjustment of the support. The contact spring 61 is in electrical contact with the member 62, Figs. 1 and 2, to form a plug or slip connection suitable for engaging the contacts of a jack whereby the indicator may be quickly withdrawn from the jack contact for inspection or adjustment.

The conductor 9 is connected to the terminal 63 of the plug member 64 adapted to engage a jack contact in the same manner as the plug member 62 and the conductor 11 is connected to terminal 65 of the contact spring 58. With the indicator in operating position the frame of the indicator unit is grounded as by the ground spring 66 which passes over a raised portion 70 of the frame 1 as the plugs 62 and 64 are inserted into the jack thereby maintaining the unit in its operating position.

In operation sufficient restoration impulses are applied to the plug member 64, the impulse circuit continuing by way of conductor 9, winding of electro-magnet 3, conductor 11, contact spring 58 and thence to the grounded contact 59 to cause the hub assembly 41 to be stepped ahead by the electro-magnet to its blank position. As the roller 56 moves into its blank position the contact spring 58 is disengaged from the grounded contact 59 thereby removing ground from one end of the winding of the electro-magnet and causing the restoration impulse circuit to be interrupted and the indicator to be set on its blank position with the contact spring 58 in engagement with the contact spring 61. When the series of restoration impulses have been concluded, the plug member 62 and contact spring 61 have ground applied thereto and actuating impulses are received at the contact member 64 sufficient in number to cause the indicator unit to take a setting in accordance with the digit to be displayed thereby. With the indicator at its blank setting, the first actuation impulse received by the plug member 64 energizes the electro-magnet 3 over a circuit including contact springs 58 and 61 and attracts the armature 12 to its operate position. When this impulse terminates the electro-magnet is de-energized thereby causing the armature 12 to be moved to its unoperated position by the retractile spring 25. As the armature moves to its unoperated position the hub 41 and roller 56 are angularly advanced one step to position 1 thereby disengaging the contact spring 58 from the grounded contact spring 61 and moving the contact spring 58 into engagement with the grounded contact 59. The second and succeeding actuation impulses received by the electro-magnet 3 are continued by way of the contact spring 58 and grounded contact 59 until sufficient actuation impulses have been received to advance the indicator to a setting corresponding to the digit to be displayed thereby.

The contact springs 58 and 61 and the plug members 62 and 64 are clamped together in a spring pile-up assembly held securely by the screws 67 passing through a clamping plate 68 and a bracket 69 attached to the frame 1, the nuts 71 and washers 72 being provided for this purpose. The springs 58 and 61 are electrically insulated from one another by insulating strips 73 which are employed also to insulate the plug members 62 and 64 from each other and from the frame of the indicator unit. The pile-up assembly also includes a jockey spring 74 having one end thereof formed at 60 to engage the teeth of the ratchet wheel thereby to cause the ratchet wheel to continue its movement after the armature has been arrested by the backstop 17 and for the additional purpose of centering the ratchet wheel in each of its set positions.

Referring now to Fig. 5 of the drawing on which is shown the armature in an unoperated position with the driving arm 33 thereof retracted, the resilient pawl member 35 is disengaged from the face of the tooth of the ratchet wheel and in engagement with the pawl stop member 34 at the formed portion 38 of the resilient member. As the electro-magnet is energized thereby attracting the armature 12 and causing the driving arm 33 and member 34 thereof to move about the bearing rod and advance the portion 38 of the resilient pawl in a direction substantially along the face of the tooth of the ratchet wheel 39, the formed portion 38 of the resilient pawl is brought into contact with the face of the tooth of the ratchet wheel. During the latter portion of the operate movement of the armature, as the driving arm 33 thereof continues to advance, the portion 38 of the resilient pawl member moves along the face of the tooth of the ratchet wheel in contact with the face of the tooth and passes over the end of the tooth of the ratchet wheel as the armature is arrested by the back stop 17 and comes to rest against the member 34, thereby locking the driving arm 33 to the opposite face of the tooth of the ratchet wheel at a point preferably near the tip of the tooth, whereby the maximum torque is applied to the ratchet wheel by the pawl member 35 as the driving arm 33 of the armature 12 recedes toward its unoperated position by the action of the retractile spring 25 responsive to the deenergization of the electromagnet.

The member 34 is employed to maintain the resilient pawl member 38 out of engagement with the ratchet wheel until the armature 12 has completed substantially one-half of its operate stroke whereby the armature is free to move against the action of the retractile spring 25 at the start of its operate stroke and is unhindered by friction between the resilient pawl member and the ratchet wheel until the operate stroke has been substantially one-half completed. The formed member 38 of the pawl is tensioned against the back stop 34 thereby insuring quick and positive action of the member 38 in passing over the tip of the tooth of the ratchet wheel, as from its position shown in Fig. 6 to that shown in Fig. 7, in which latter position the member 38 is positioned to exert a pull on the ratchet wheel to step it in the direction of the curved arrows. The ratchet wheel thus begins its movement substantially in synchronism with the release of the armature whereby full advantage is taken of the action of the retractile spring 25 in operating the ratchet wheel and indicating drum and excessive wear of the ratchet wheel and member 38 is avoided.

When the movement of the armature is arrested by the backstop 17 the ratchet wheel has been moved by the resilient pawl member 35 substantially one-half the angular distance subtended by one tooth of the ratchet wheel, the ratchet wheel continuing its movement by virtue of the kinetic energy stored in the hub assembly 41, assisted by the jockey spring 74. The tip of the tooth of the ratchet wheel just engaged by the formed portion 38 of the driving member 35 moves away from the formed portion 38 and the next succeeding tooth of the ratchet wheel is brought into operative position for subsequent engagement by the pawl 35 with the portion 38 of the resilient driving member in proximate relation with the succeeding tooth substantially as shown on Fig. 5 of the drawing. This arrangement enables a small air gap to be employed between the armature 12 and the core of the electro-magnet whereby the armature is quickly responsive to the energization of the electro-magnet and the force of magnetic attraction therebetween is strong with a relatively weak current flowing through the electromagnet. A quick acting retractile spring 25 may thus be employed to cause the armature and driving pawl assemblies to be actuated at a relatively high rate of speed and without the possibility of improper operation as the indicator moves into its blank position wherein the contact spring 58 is actuated by the roller 56 into engagement with the contact spring 61, the roller 52 and cam surface 51 compensating for the additional energy required to actuate the contact spring 58.

A hub 75 is slidably and rotatably mounted upon the shaft 44 at the bearings 76 and 77, the bearing 77 being formed within the sleeve 78 positioned within the hub 75 or, if desired, the bearing 77 may be formed directly from the hub 75, in which latter case the sleeve would not be required.

The hub has mounted thereon a drum 79 secured thereto as by pinning or riveting the parts together at 81, the drum having a series of indicia 1 to 9 and 0 corresponding to the first ten positions respectively of the drum and an eleventh or blank position. A tubular cam member 82 is attached to the hub 75 in any suitable manner such, for example, as by forcing it into the recess provided, the cam member being in operative engagement with a complementary cam member such as the pin 83 carried by the hub member 41 whereby the hub 41 and ratchet wheel 39 may be stepped ahead quickly to any desired position by the electro-magnet 3, which action is accompanied by both axial and angular movement of the indicating drum which follows the movement of the ratchet wheel 39 in more leisurely fashion and invariably comes to rest in a position corresponding to the set position of the ratchet wheel, generally in the manner disclosed and claimed in my Patent No. 2,272,242, issued February 10, 1942. The hub 41 is provided preferably with a recessed portion 80 within which the cam member 82 operates thereby providing a structure in which dirt and such other substances as might possibly interfere with the operation of the cam mechanism are excluded from the operating surfaces of the cam and complementary cam surfaces.

A spacing member 84, preferably annular in shape, is positioned between the lower end of the hub 75 and the indicating drum to provide a structure wherein the indicating drum is both light and strong and the hub relatively heavy, thereby providing a drum assembly possessing the advantages of rigidity and weight with a relatively low moment of inertia.

The indicator is provided with a mask 85, affixed to the front of the unit, and held in position by the studs 2, the ends of the mask being formed at 86 to engage the studs, with the mask in the position shown on the drawing, the formed portions 86 extending about the studs sufficiently to retain the mask in position and to permit ready removal of the mask from the front of the unit, as may be required for inspection or adjustment of the unit. The mask is provided with an aperture 87 through which the selected digit or blank, as the case may be, is exposed. The mask is also provided with an outwardly extending curved portion 88 above the aperture to provide clearance for the drum during axial and angular movement of the same when taking a new setting. The mask is likewise provided with an outwardly extending portion 89 along the sides and bottom of the aperture, Fig. 3, to enhance the appearance of the indicator and prevent the exposure of the lower edge of the drum in any of its set positions.

While the invention has been described in detail with respect to a particular preferred example thereof which gives satisfactory results, it will be understood by those skilled in the art after understanding the invention, that various changes and modifications may be made without departing from the spirit and scope of the invention, and it is intended therefore in the appended claims to cover all such changes and modifications.

What is claimed as new and desired to be secured by Letters Patent is:

1. An indicator unit comprising a rotatable indicator having a home position and a plurality of moved positions, indicator actuating means comprising an electromagnet and associated armature and driving pawl assembly, a first circuit effective when the indicator is in any of its moved positions for operating said electromagnet and restoring the indicator from any of its moved positions to its home position, a second circuit effective when the indicator is in its home position for causing the electromagnet to actuate the indicator from its home position to a moved position, means for switching the electromagnet from said first circuit to the second circuit as the indicator moves into its home position, and means for storing energy imparted thereto by the movement of the indicator as it is actuated toward its home position for effectively supplying additional energy for actuating said switching means.

2. An indicator unit comprising a rotatable indicator having a home position and a plurality of moved positions, electro-responsive means including a ratchet mechanism for actuating said indicator, switching means for rendering the electro-responsive means ineffective as the indicator moves into the home position, means controlled by the ratchet mechanism for actuating said switching means, a cam connected to said indicator and actuated by said ratchet mechanism, a cam follower in engagement with said cam, and means for causing the cam to be operated by the follower as the indicator moves into its home position thereby to aid the ratchet mechanism in actuating said switching means.

3. An indicator unit comprising a rotatable indicator having a home position and a plurality of moved positions, electro-responsive means including a pawl and ratchet mechanism for rotating said indicator to its different positions, a switching mechanism for rendering said electro-responsive means ineffective as the indicator moves into its home position, means operated by said pawl and ratchet mechanism for actuating said switching mechanism, means effective as the indicator is rotated to each of its moved positions for successively storing energy received from the pawl and ratchet mechanism, and means for releasing said energy as the indicator moves into its blank position thereby to compensate for the actuation of said switching mechanism by said actuating means.

4. An indicator unit comprising a rotatable indicator having a home position and a plurality of moved positions, electro-responsive means including a pawl and ratchet mechanism for actuating said indicator to its different positions, switching mechanism comprising a contact spring member settable to different settings in accordance with the position of the indicator, means rotatable with said indicator for actuating said switching mechanism, and means for storing energy imparted thereto by the movement of the indicator as it is actuated by said pawl and ratchet mechanism for supplying additional energy for actuating said switching mechanism whereby the pawl and ratchet mechanism performs substantially the same amount of work during each operation of the pawl and ratchet mechanism.

5. An indicator unit comprising a rotatable indicator, actuating means including an electromagnet and an operating circuit therefor for selectively stepping said indicator to a plurality of moved positions including a home position, said actuating means comprising a ratchet wheel operatively connected to the indicator, a reciprocating armature having a driving arm operated by said electromagnet and a pawl mounted on the driving arm for driving said indicator impulsively step-by-step in accordance with stepping impulses applied to said elctromagnet, means normally maintaining said pawl out of engagement with said ratchet wheel, said last named means causing said pawl to engage the ratchet means a predetermined interval after said armature begins to move for stepping the ratchet wheel, switching means and operating means therefor actuatable by and controlled in accordance with the stepping movement of the indicator for controlling said operating circuit for the electromagnet as the indicator moves into its home position, and means including a cam rotatable by and in accordance with the stepping movement of the indicator and a resilient cam follower bearing on said cam for storing energy imparted thereto by the stepping movement of the indicator as it is actuated to its various moved positions and towards its home position for supplying additional energy for actuating said switching means.

6. An indicator unit comprising, in combination, a rotatable indicator actuatable impulsively step-by-step to different positions in accordance with the information to be displayed thereby, an electromagnet responsive to stepping impulses, an armature controlled by said electromagnet, said armature having a driving assembly secured thereto comprising a driving arm and a pawl stop member rigidly secured to the free end of said driving arm, a spring driving pawl secured to said driving arm assembly and having a free end, a ratchet wheel for driving the rotatable indicator under the influence of said spring pawl, means including said pawl stop member normally preventing said spring pawl from engaging with the teeth of said ratchet wheel but operable to cause the free end of the spring pawl to advance in a direction substantially along the face of the adjacent tooth of the ratchet wheel upon energization of said electromagnet, means including said pawl stop member for causing the free end of the pawl to slip over and engage the tip of the adjacent tooth of said ratchet wheel during the latter portion of the operating movement of the armature when attracted by the electromagnet, and a spring actuating member for moving the driving arm assembly in the reverse direction to step the indicator upon deenergization of said electromagnet, said resilient pawl member rotating the ratchet wheel due to the engagement of the free end of the driving pawl with the tip of the adjacent tooth of the ratchet wheel.

7. An indicator unit comprising a rotatable indicator selectively actuatable impulsively step-by-step to different positions in accordance with the information to be displayed thereby, a ratchet wheel operatively connected to said indicator for stepping the same, a driving assembly associated with said ratchet wheel comprising a reciprocable driving arm and a pawl stop member carried by said driving arm, a driving pawl having one end secured to the driving arm assembly and a free end for engaging the teeth of the ratchet wheel, means including an electromagnet responsive to electrical stepping impulses for actuating said driving arm in one direction when the electromagnet is energized and spring means for actuating the driving arm in the opposite direction during each operating cycle of the driving arm, means comprising said pawl stop member for preventing the free end of said pawl from engaging with the adjacent tooth of said ratchet wheel during a substantial portion of the movement of the driving arm under the influence of said electromagnet, but operable to cause the free portion of the pawl to advance in a direction substantially along the face of the adjacent tooth of the ratchet wheel during energization of said electromagnet, said driving arm and pawl stop member causing the free end of the pawl to slip over and engage the adjacent tooth of said ratchet wheel during the latter portion of the operating movement of the driving arm when actuated by the electromagnet, said spring means moving the driving arm assembly in the reverse direction to step the indicator upon deenergization of said electromagnet, said pawl rotating the ratchet wheel due to the engagement of the free end of the pawl with the adjacent tooth of the ratchet wheel.

8. An indicator unit comprising a rotatable indicator selectively actuatable impulsively step-by-step to different positions in accordance with the information to be displayed thereby, a ratchet wheel operatively connected to said indicator for stepping the same, a driving assembly associated with said ratchet wheel comprising a reciprocable driving arm and a pawl stop member carried by said driving arm, a driving pawl having one end secured to the driving arm assembly and a free end for engaging the teeth of the ratchet wheel, means including an electromagnet responsive to electrical stepping impulses for actuating said driving arm in one direction when the electromagnet is energized and spring means for actuating the driving arm in the opposite direction during each operating cycle of the driving arm, means comprising said pawl stop member for preventing the free end of said pawl from engaging with the adjacent tooth of said ratchet wheel during substantially one-half of the operating stroke of the driving arm under the influence of said electromagnet, but operable to cause the free portion of the pawl to advance in a direction substantially along the face of the adjacent tooth of the ratchet wheel during energization of said electromagnet, said driving arm and pawl stop member causing the free end of the pawl to slip over and engage the adjacent tooth of said ratchet wheel during the latter portion of the stroke of the driving arm when actuated by the electromagnet, said spring means moving the driving arm assembly in the reverse direction to step the indicator upon deenergization of said electromagnet, said pawl rotating the ratchet wheel due to the engagement of the free end of the pawl with the adjacent tooth of the ratchet wheel.

9. An indicator unit comprising a rotatable indicator selectively actuatable impulsively step-by-step to different positions in accordance with the information to be displayed thereby, a ratchet wheel operatively connected to said indicator for stepping the same, a driving assembly associated with said ratchet wheel comprising a reciprocable driving arm and a pawl stop member carried by said driving arm, a driving pawl having one end secured to the driving arm assembly and a free end for engaging the teeth of the ratchet wheel, means including an electromagnet responsive to electrical stepping impulses for actuating said driving arm in one direction when the electromagnet is energized and spring means for actuating the driving arm in the opposite direction during each operating cycle of the driving arm, means comprising said pawl stop member for preventing the free end of said pawl from engaging with the adjacent tooth of said ratchet wheel during a substantial portion of the movement of the driving arm under the influence of said electromagnet, but operable to cause the free portion of the pawl to advance in a direction substantially along the face of the adjacent tooth of the ratchet wheel during energization of said electromagnet, said driving arm and pawl stop member causing the free end of the pawl to slip over and engage the adjacent tooth of said ratchet wheel during the latter portion of the operating movement of the driving arm when actuated by the electromagnet, said spring means moving the driving arm assembly in the reverse direction to step the indicator upon deenergization of said electromagnet, said pawl rotating the ratchet wheel substantially one-half step due to the engagement of the free end of the pawl with the adjacent tooth of the ratchet wheel, and a jockey spring coacting with others of the teeth of the ratchet wheel for causing the ratchet wheel to be moved substantially the remaining half-step of its travel for each stepping cycle of the driving assembly.

ERNEST FRISCHKNECHT.